United States Patent
Salvia et al.

(10) Patent No.: US 9,661,433 B2
(45) Date of Patent: May 23, 2017

(54) ELECTRICAL TESTING AND FEEDTHROUGH CANCELLATION FOR AN ACOUSTIC SENSOR

(71) Applicant: InvenSense, Inc., San Jose, CA (US)

(72) Inventors: James Salvia, Redwood City, CA (US); Baris Cagdaser, Sunnyvale, CA (US); Aleksey S. Khenkin, Nashua, NH (US)

(73) Assignee: INVENSENSE, INC., San Jose, CA (US)

( * ) Notice: Subject to any disclaimer, the term of this patent is extended or adjusted under 35 U.S.C. 154(b) by 403 days.

(21) Appl. No.: 14/168,983

(22) Filed: Jan. 30, 2014

(65) Prior Publication Data
US 2015/0289073 A1 Oct. 8, 2015

(51) Int. Cl.
*H04R 29/00* (2006.01)
*H04R 19/00* (2006.01)
*G01H 17/00* (2006.01)

(52) U.S. Cl.
CPC ........... *H04R 29/004* (2013.01); *G01H 17/00* (2013.01); *H04R 19/005* (2013.01); *H04R 2201/003* (2013.01)

(58) Field of Classification Search
CPC ............ H04R 29/004; H04R 2201/003; H04R 19/005; G01H 17/00
USPC ......................................................... 381/58
See application file for complete search history.

(56) References Cited

U.S. PATENT DOCUMENTS 7,290,435 B2    11/2007  Seeger et al.
2014/0267880 A1*  9/2014  Aranovsky ........ G01R 27/2605
                                                            348/357
2015/0110295 A1*  4/2015  Jenkner .................... H04R 1/08
                                                            381/114

OTHER PUBLICATIONS

Agilent Technologies, "Agilent's Best-In-Class Impedance Test Instruments", Nov. 12, 2007, http://cp.literature.agilent.com/litweb/pdf/5989-7517EN.pdf, pp. 1-8.*
Agilent Technologies, "Improving the Test Efficiency of MEMS Capacitive Sensors Using the Agilent E4980A Precision LCR Meter", Apr. 13, 2007, http://cp.literature.agilent.com/litweb/pdf/5989-6518EN.pdf, pp. 1-5.*

* cited by examiner

*Primary Examiner* — Davetta W Goins
*Assistant Examiner* — Daniel Sellers
(74) *Attorney, Agent, or Firm* — Amin, Turocy & Watson, LLP

(57) ABSTRACT

A method and circuit for testing an acoustic sensor are disclosed. In a first aspect, the method comprises using electro-mechanical features of the acoustic sensor to measure characteristic of the acoustic sensor. In a second aspect, the method comprises utilizing an actuation signal to evaluate mechanical characteristics of the acoustic sensor. In a third aspect, the method comprises using a feedthrough cancellation system to measure a capacitance of the acoustic sensor. In the fourth aspect, the circuit comprises a mechanism for driving an electrical signal into a signal path of the acoustic sensor to cancel an electrical feedthrough signal provided to the signal path, wherein any of the electrical signal and the electrical feedthrough signal are within or above an audio range.

28 Claims, 7 Drawing Sheets

US 9,661,433 B2

ELECTRICAL TESTING AND FEEDTHROUGH CANCELLATION FOR AN ACOUSTIC SENSOR

FIELD OF THE INVENTION

The present invention relates to acoustic sensors, and more particularly, to electrical testing and feedthrough cancellation for the acoustic sensors.

BACKGROUND

Microelectromechanical systems (MEMS) devices (e.g., microphones, accelerometers, gyroscopes, compasses, pressure sensors) operate by detecting forces on proof masses or membranes. Conventionally, acoustic sensors and microphones (including MEMS microphones) are tested acoustically, which requires acoustic testing equipment that can be costly and inefficient. Furthermore, this conventional acoustic testing is difficult to realize in-situ after the acoustic sensor has been integrated into another product. Therefore, there is a strong need for a solution that overcomes the aforementioned issues. The present invention addresses such a need.

SUMMARY OF THE INVENTION

A method and circuit for testing an acoustic sensor are disclosed. In a first aspect, the method comprises determining electro-mechanical features of the acoustic sensor and measuring characteristics of the acoustic sensor based on the determined electro-mechanical features.

In a second aspect, the method comprises utilizing an actuation signal to evaluate mechanical characteristics of the acoustic sensor.

In a third aspect, the circuit comprises a mechanism for driving an electrical signal into a signal path of the acoustic sensor to cancel an electrical feedthrough signal provided to the signal path, wherein any of the electrical signal and the electrical feedthrough signal are within or above an audio range.

BRIEF DESCRIPTION OF THE DRAWINGS

The accompanying figures illustrate several embodiments of the invention and, together with the description, serve to explain the principles of the invention. One of ordinary skill in the art readily recognizes that the embodiments illustrated in the figures are merely exemplary, and are not intended to limit the scope of the present invention.

DETAILED DESCRIPTION

Figure 1:
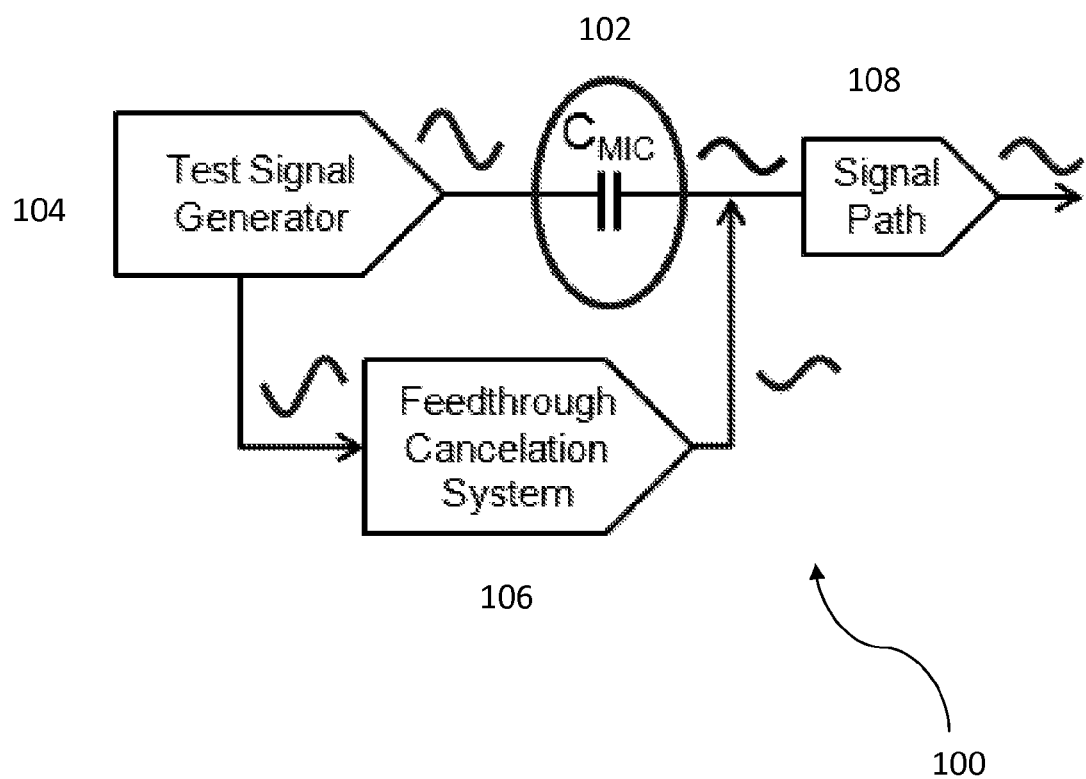
FIG. 1 illustrates a block diagram of a device for testing an acoustic sensor in accordance with an embodiment.

The present invention relates to acoustic sensors, and more particularly, to electrical testing and feedthrough cancellation for the acoustic sensors. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

Micro-Electro-Mechanical Systems (MEMS) refers to a class of devices fabricated using semiconductor-like processes and exhibiting mechanical characteristics such as the ability to move or deform. MEMS often, but not always, interact with electrical signals. A MEMS device may refer to a semiconductor device implemented as a microelectromechanical system. A MEMS device includes mechanical elements and optionally includes electronics for sensing or driving. MEMS devices include but are not limited to gyroscopes, accelerometers, magnetometers, and microphones.

In MEMS devices, a port is an opening through a substrate to expose MEMS structure to the surrounding environment. A chip includes at least one substrate typically formed from a semiconductor material. A single chip may be formed from multiple substrates, wherein the substrates are mechanically bonded to preserve functionality. Multiple chip includes at least two substrates, wherein the at least two substrates are electrically connected but do not require mechanical bonding.

MEMS wafers are silicon wafers that contain MEMS structures. MEMS structures may refer to any feature that may be part of a larger MEMS device. One or more MEMS features comprising moveable elements is a MEMS structure. MEMS features may refer to elements formed by a MEMS fabrication process such as bump stop, damping hole, via, port, plate, proof mass, standoff, spring, and seal ring.

MEMS substrates provide mechanical support for the MEMS structure. The MEMS structural layer is attached to the MEMS substrate. The MEMS substrate is also referred to as handle substrate or handle wafer. In some embodiments, the handle substrate serves as a cap to the MEMS structure. Bonding may refer to methods of attaching. The MEMS substrate and an integrated circuit (IC) substrate may be bonded using methods including, but not limited to, a eutectic bond (e.g., AlGe, CuSn, AuSi), a fusion bond, compression, thermocompression, or an adhesive bond (e.g., glue, solder, anodic bonding, glass frit). An IC substrate may refer to a silicon substrate with electrical circuits, typically CMOS circuits. A package provides electrical connection between bond pads on the chip to a metal lead that can be soldered to a printed board circuit (PCB). A package typically comprises a substrate and a cover.

Acoustic sensors (including but not limited to microphones and MEMS microphones) require testing of a plurality of parameters. Conventionally, acoustic sensors and microphones (including MEMS microphones) are tested acoustically. The invention described herein makes use of electronically-controlled actuation of the transducer. Electrical feedthrough signals resulting from electronically-controlled actuation can be significantly larger than the signals created by transducer motion. For example, electrostatic transduction of a parallel plate capacitive transducer requires driving the transducer directly with an electrical signal, some of which will feed through the capacitive element. Therefore, canceling the unwanted electrical feedthrough signals improves feasibility and accuracy of tests that rely on electrostatic forces. A method and system in accordance with the present invention provides feedthrough cancellation circuitry that is multi-purpose in that it not only cancels the unwanted electrical feedthrough signals to improve testing accuracy of the acoustic sensor, but it also can be used in place of traditional trans-capacitive methods to measure capacitance to improve circuit re-use and circuit area/design constraints. Additionally, the electrical testing via the feedthrough cancellation circuitry can be done in-situ, thereby enabling self-test/calibration after the acoustic sensor has been integrated into a larger system/device.

In one embodiment, any of a system, device, and circuit are utilized to drive an electrical signal into an input of a transducer interface circuit, including, but not limited to, a microphone, to cancel at least another signal. The electrical signal's amplitude and/or phase may be adjustable by the circuit to maximize cancellation. In one embodiment, the circuit (and integrated hardware and/or software components) that enables the cancellation is integrated into the microphone device. In another embodiment, the circuit is coupled externally to the microphone device.

In one embodiment, a method for testing utilizes a circuit to test an electronically-controlled transducer and to cancel electrical feedthrough signals that result from electronically-controlled transduction of the transducer. The electronically-controlled transducer can be one of a variety of devices including, but not limited to, an acoustic sensor or a microphone. In another embodiment, a method utilizes a circuit to evaluate a capacitance of an acoustic sensor.

In one embodiment, a method for testing utilizes electronically-controlled actuation to mimic an acoustic input to an acoustic sensor in order to electrically evaluate the acoustic sensor's sensitivity to acoustic signals. The electronically-controlled actuation scheme may use any of electrostatic, magnetic, thermal, and piezoelectric forces. In another embodiment, the method also utilizes feedthrough cancellation to remove unwanted effects of electrical feedthrough.

In one embodiment, a method for testing utilizes an electronically-controlled actuation pulse to evaluate any of a microphone's frequency response, resonant frequency, quality factor, damping, impulse response, effective spring constant, and effective mass. The actuation pulse includes any of electrostatic, magnetic, thermal, and piezoelectric forces. In another embodiment, the method also utilizes feedthrough cancellation to remove unwanted effects of electrical feedthrough.

In one embodiment, a method for testing measures an acoustic sensor's capacitance uses electrical feedthrough cancellation by employing, in order to reduce unwanted acoustic sensor/device motion that results from electrostatic force, a frequency at which the mechanical system's response is minimized. In another embodiment, unwanted acoustic sensor/device motion is reduced by balancing the electrostatic force with force from another actuation, which could be electrostatic, magnetic, thermal, or piezoelectric. In another embodiment, unwanted acoustic sensor/device motion is reduced by using mechanical stops that prevent motion when engaged. In another embodiment, in addition to measuring capacitance of the acoustic sensor, the method for testing is also used to determine other properties of the acoustic sensor including, but not limited to, an electrical and/or mechanical gap between electrodes of the acoustic sensor.

In one embodiment, electrical testing of an acoustic sensor is implemented as part of a test and/or trim routine by a manufacturer of the acoustic sensor in order to measure the sensor's parameters during production/manufacturing. In this embodiment, the hardware and/or software that are used for the testing may be implemented in a device that is external to the microphone. In another embodiment, electrical testing of an acoustic sensor is implemented during and/or after assembly of the sensor in order to measure the sensor's parameters after the sensor has been integrated into a larger product. In this embodiment, the hardware and/or software that are used for the testing are implemented partially or fully in the microphone itself.

In one embodiment, to mimic acoustic inputs, an electrostatic force is applied to a MEMS device (e.g. MEMS microphone) using a voltage generator. This voltage generator creates a signal at an output of the MEMS microphone via both electrical feedthrough and MEMS motion. In this embodiment, the electrical feedthrough is cancelled using an electrical feedthrough cancellation system, which allows for measurement of the MEMS motion without any corruptions from the electrical feedthrough. In this embodiment, the electrical feedthrough cancellation system can utilize a variety of parameters to also measure the capacitance of the MEMS microphone.

To describe the features of the present invention in more detail, refer now to the following description in conjunction with the accompanying Figures.

FIG. 1 illustrates a block diagram of a device 100 for testing an acoustic sensor in accordance with an embodiment. The device 100 includes an acoustic sensor 102, a test signal generator 104, a feedthrough cancellation system 106, and a signal path 108. The test signal generator 104 generates electrically-controlled forces that are applied to the acoustic sensor 102. The acoustic sensor output is sensed by the signal path 108, which may buffer or amplify the sensor's response to the generated electrostatic forces. The feedthrough cancellation system 106 cancels at least a portion of a signal that results from electrical feedthrough thereby leaving only a portion of the signal that results from motion of the acoustic sensor 102.

Figure 2:
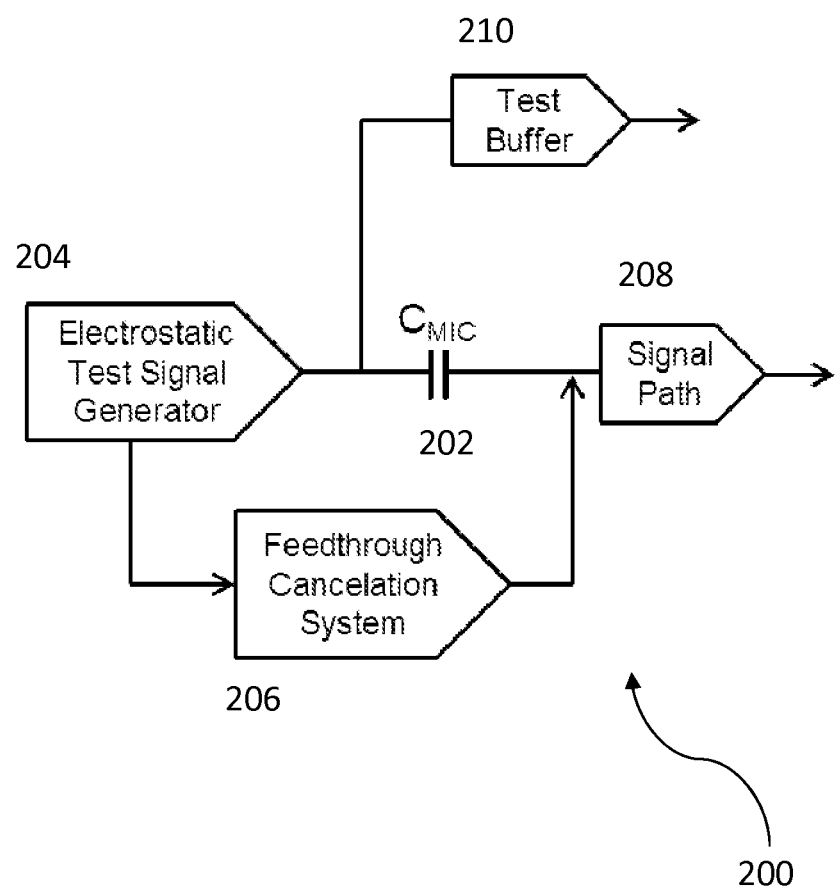
FIG. 2 illustrates a block diagram of another device for testing an acoustic sensor in accordance with an embodiment.

FIG. 2 illustrates a block diagram of another device 200 for testing an acoustic sensor in accordance with an embodiment. The device 200 includes a capacitive microphone 202, an electrostatic test signal generator 204, a feedthrough cancellation system 206, a signal path 208, and a test buffer 210. The capacitive microphone 202 comprises at least two electrodes, wherein at least one of the at least two electrodes is free to move with respect to the other in response to acoustic energy. The test signal generator 204 generates electrostatic forces that are applied to the capacitive microphone 202. The signal path 208 may buffer or amplify the output of the capacitive microphone 202.

The electrostatic signal generator 204 creates a signal at the output of the capacitive microphone 202. This signal is comprised of two separate effects: a) electrostatic force causes the capacitive microphone 202 to move, and the motion is converted by the signal path 208 into a signal that serves as the output of the capacitive microphone 202, and b) direct electrical feedthrough across the capacitive microphone 202 is buffered or amplified by the signal path 208. The feedthrough cancellation system 206 cancels at least a portion of a signal that results from electrical feedthrough thereby leaving only a portion the signal that results from motion of the capacitive microphone 202. The test buffer 210 monitors the electrostatic forces and stimulus that are applied to the capacitive microphone 202. Measurement of the output of the electrostatic force generator 204 through the test buffer 210 is used to precisely calculate the force being applied to the capacitive microphone 202, which improves the accuracy of this method of measuring the sensor's acoustic sensitivity.

Figure 3:
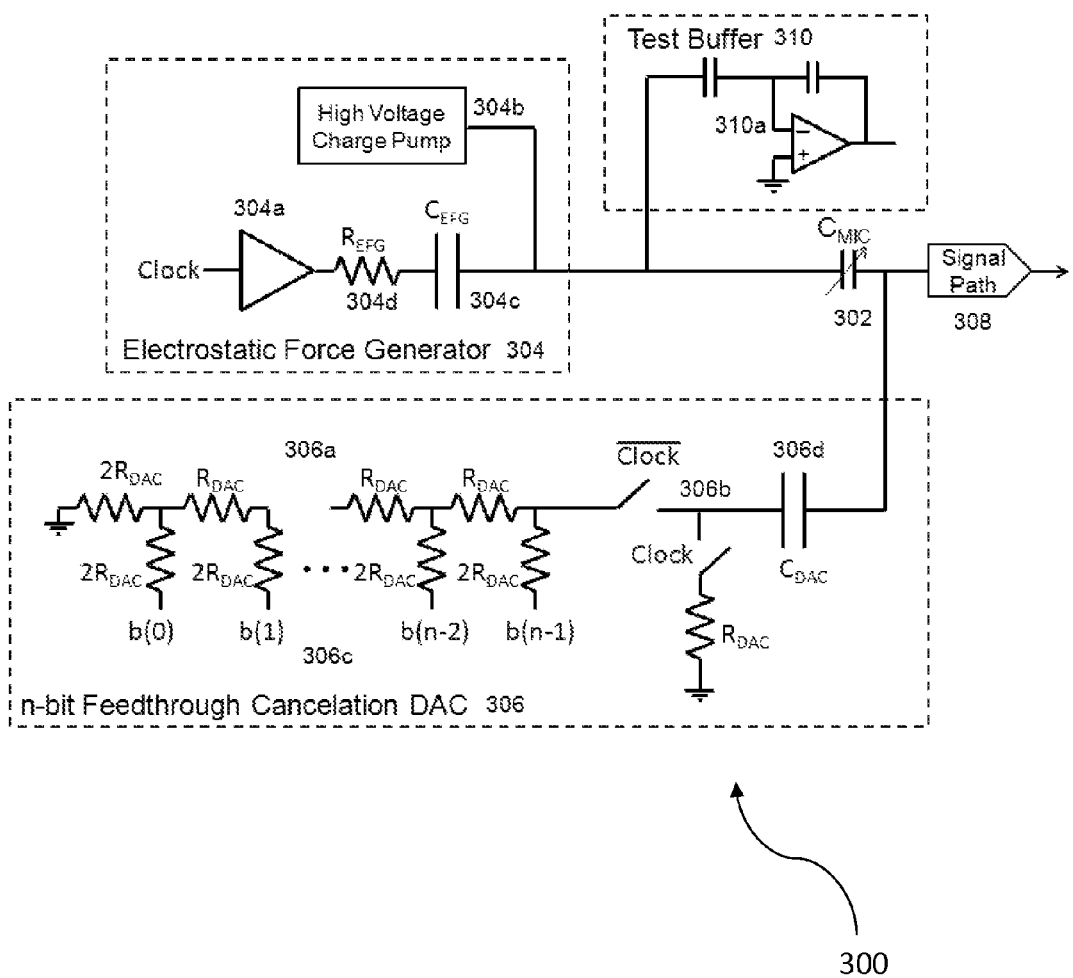
FIG. 3 illustrates a more detailed block diagram of another device for testing an acoustic sensor in accordance with an embodiment.

FIG. 3 illustrates a more detailed block diagram of another device 300 for testing an acoustic sensor in accordance with an embodiment. The device 300 includes a capacitive microphone 302, an electrostatic force generator 304, an n-bit feedthrough cancellation digital-to-analog converter (DAC) 306, a signal path 308, and a test buffer 310. The electrostatic force generator 304 utilizes a voltage buffer 304a to drive a test signal onto the output of a high voltage charge pump (HVCP) 304b. The output of the voltage buffer 304a is coupled through capacitor ($C_{EFG}$) 304c so that it does not disturb the DC voltage at the output of the HVCP 304b. A resistor ($R_{EFG}$) 304d is used to control a time constant of the applied waveform.

In one embodiment, the n-bit feedthrough cancellation DAC 306 comprises an R-2R ladder 306a that is used to generate a programmable voltage level. By alternating between this voltage and ground in response to an input clock, the switches 306b create a square wave whose amplitude is set by DAC input bits b(0) through b(n−1) 306c. The square wave is coupled through capacitor $C_{DAC}$ 306d to the input of the capacitive microphone 302.

The n-bit feedthrough cancellation DAC 306 provides a constant output resistance $R_{DAC}$ which produces a fixed time constant for both rising and falling edges at the output of the n-bit feedthrough cancellation DAC 306. The time constants of the n-bit feedthrough cancellation DAC 306 and the electrostatic force generator 304 can be tuned and/or designed to be equal, thereby maximizing the cancellation of the electrical feedthrough. The test buffer 310 comprises a capacitive feedback inverting voltage amplifier 310a that is used to monitor the voltage waveform applied by the electrostatic force generator 304.

In one embodiment, the n-bit feedthrough cancellation DAC 306 is an 8-bit R-2R DAC with input bits b0-b7 that are trimmed so as to optimally cancel electrical feedthrough signals at the microphone output. The capacitance of the 8-bit R-2R DAC ($C_{DAC}$) is programmable to allow for a large cancellation range. A constant output impedance of R is convenient for giving constant phase shift, which can be matched by other blocks in the electrical feedthrough cancellation system.

Figure 4:
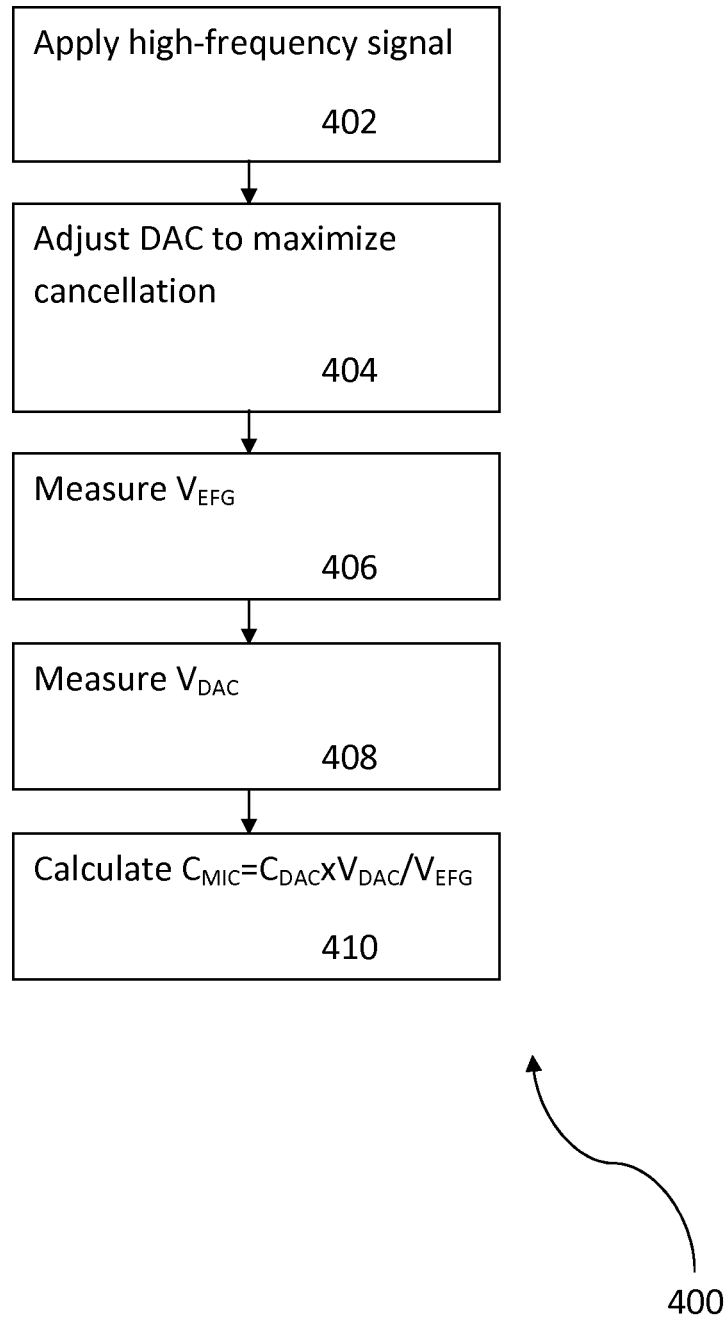
FIG. 4 illustrates a method for measuring microphone capacitance ($C_{MIC}$) in accordance with an embodiment.

FIG. 4 illustrates a method 400 for measuring microphone capacitance ($C_{MIC}$) in accordance with an embodiment. In one embodiment, the method 400 utilizes a device with similar components (capacitive microphone, electrostatic force/test signal generator, feedthrough cancellation system, signal path, and test buffer) as the aforementioned device 200. The method 400 utilizes the electrostatic force generator to drive a signal waveform into the capacitive microphone, via step 402. The waveform is chosen to have a frequency at which the mechanical response of the acoustic sensor is diminished, thereby reducing unwanted mechanical response. As a result, the acoustic sensor's response to this signal is determined by electrical feedthrough, and not by motion of the capacitive microphone.

The method 400 engages the feedthrough cancellation path and adjusts the feedthrough cancellation system DAC until the signal at the output of the capacitive microphone is minimized, via step 404. At this point, the feedthrough cancellation system DAC has been trimmed to maximally cancel the electrical feedthrough from the electrostatic force generator. The method 400 measures the signal on the HVCP output (defined as $V_{EFG}$) using the test buffer, via step 406, and measures the signal on the feedback cancellation system DAC output (defined as $V_{DAC}$), via step 408. The method 400 calculates the microphone capacitance ($C_{MIC}$) from the measured parameters, via step 410. In another embodiment, the aforementioned steps of the method 400 are carried out in a different order.

Figure 5:
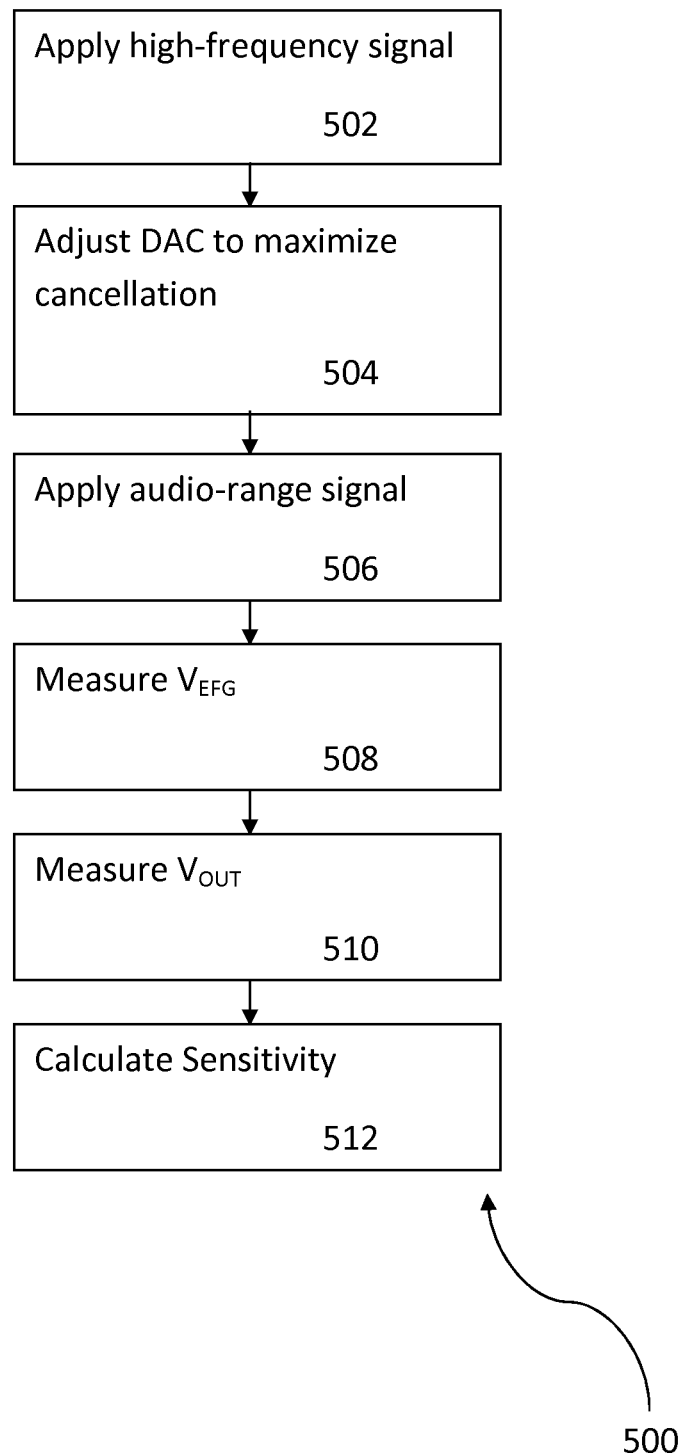
FIG. 5 illustrates a method for measuring microphone sensitivity in accordance with an embodiment.

FIG. 5 illustrates a method 500 for measuring microphone sensitivity in accordance with an embodiment. In one embodiment, the method 500 utilizes a device with similar components (capacitive microphone, electrostatic force/test signal generator, feedthrough cancellation system, signal path, and test buffer) as the aforementioned device 200. The method 500 utilizes the electrostatic force generator to drive a signal waveform into the capacitive microphone via step 502. The waveform is chosen to have a frequency at which the mechanical response of the acoustic sensor is diminished, thereby reducing unwanted mechanical response. As a result, the acoustic sensor's response to this signal is determined by electrical feedthrough, and not by motion of the capacitive microphone.

The method 500 engages the feedthrough cancellation path and adjusts the feedthrough cancellation system DAC until the signal at the output of the capacitive microphone is minimized, via step 504. At this point, the feedthrough cancellation system DAC has been trimmed to maximally cancel the electrical feedthrough from the electrostatic force generator. Next, the electrostatic force generator is used to drive an audio-range waveform into the capacitive microphone, via step 506. The audio range generally consists of frequencies from 20 Hz to 20 kHz. The audio-range waveform stimulates the capacitive microphone electrostatically and creates motion in a similar fashion to that created by acoustic signals.

The method 500 measures the signal on the HVCP output (defined as $V_{EFG}$) using the test buffer, via step 508, and measures the signal at the signal path output (defined as $V_{OUT}$), via step 510. The method 500 calculates the microphone sensitivity according to the following equation (1):

$$\text{Sensitivity }[V/\text{Pa}] = \frac{V_{OUT} \cdot A_{Piston} \cdot g}{V_{HVCP} \cdot C_{MIC} \cdot V_{EFG}},$$

via step 512.

In equation (1), $V_{OUT}$ is the amplitude of the voltage at the microphone output, $A_{Piston}$ is the microphone piston area (equivalent area of the microphone diaphragm that is exposed to incoming sound pressure) in meters squared, $V_{HVCP}$ is the high voltage charge pump DC voltage in volts, $V_{EFG}$ is the amplitude of the signal at the HVCP output in volts, $C_{MIC}$ is the microphone capacitance in farads, g is the equivalent electrostatic gap in meters, which can be calculated from $g = 8.854\text{e}{-12} \times A_{sense}/C_{MIC}$, where $A_{sense}$ is the equivalent sense area of the microphone sensor in meters squared.

In one embodiment, the total capacitance between the microphone sensor terminals comprises a parasitic capacitance (which does not respond to acoustic input) in parallel with a sensor capacitance (which does respond to acoustic input). In this embodiment, only the sensor capacitance is included in the calculation of the microphone sensitivity per equation (1). In another embodiment, the aforementioned steps of the method 500 are carried out in a different order.

Figure 6:
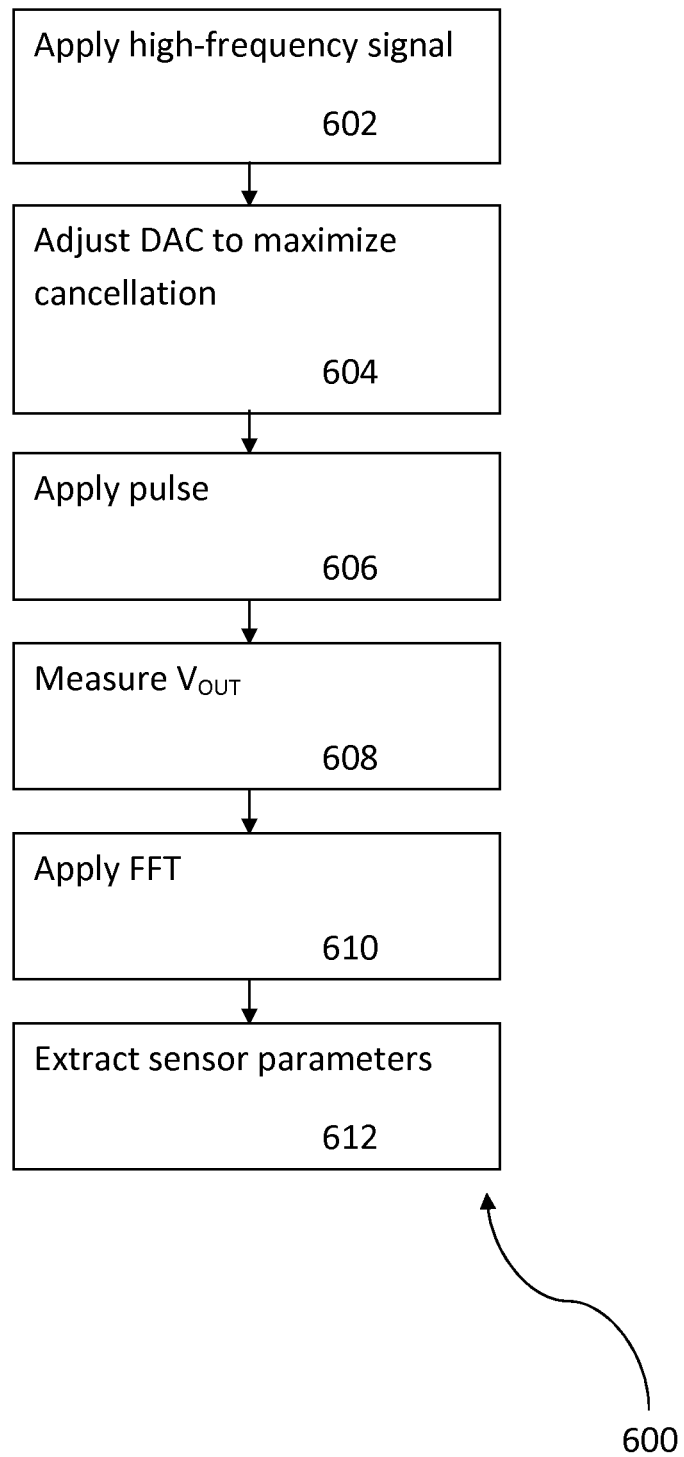
FIG. 6 illustrates a method for measuring microphone mechanical parameters in accordance with an embodiment.

FIG. 6 illustrates a method 600 for measuring microphone mechanical parameters in accordance with an embodiment. In one embodiment, the method 600 utilizes a device with similar components (capacitive microphone, electrostatic force/test signal generator, feedthrough cancellation system, signal path, and test buffer) as the aforementioned device 200. The method 600 utilizes the electrostatic force generator to drive a signal waveform into the capacitive microphone via step 602. The waveform is chosen to have a frequency at which the mechanical response of the acoustic sensor is diminished, thereby reducing unwanted mechanical response. As a result, the acoustic sensor's response to this signal is determined by electrical feedthrough and not by motion of the capacitive microphone.

The method 600 engages the feedthrough cancellation path and adjusts the feedthrough cancellation system DAC until the signal at the output of the capacitive microphone is minimized, via step 604. At this point, the feedthrough cancellation system DAC has been trimmed to maximally cancel the electrical feedthrough from the electrostatic force generator. Next, the electrostatic force generator is used to drive an electrostatic pulse into the capacitive microphone, via step 606. The time duration of the electrostatic pulse is chosen to be significantly smaller than the dominant mechanical time constants of the sensing element. In this way, the pulse can be approximated as having applied an idealized impulse force to the sensing element, because the sensing element's motion will be very slow in comparison to the pulse duration.

The method 600 measures the microphone's impulse response ($V_{OUT}$) at the microphone output, via step 608. The impulse response is converted to the frequency domain using a Fast Fourier Transform (FFT), via step 610, which directly yields the mechanical frequency response of the capacitive microphone. The method 600 extracts microphone parameters including, but not limited to, resonant frequency and quality factor from the FFT, via step 612. In another embodiment, the method 600 does not include steps 602-604 at the potential cost of corrupting the frequency response data at high frequencies.

Figure 7:
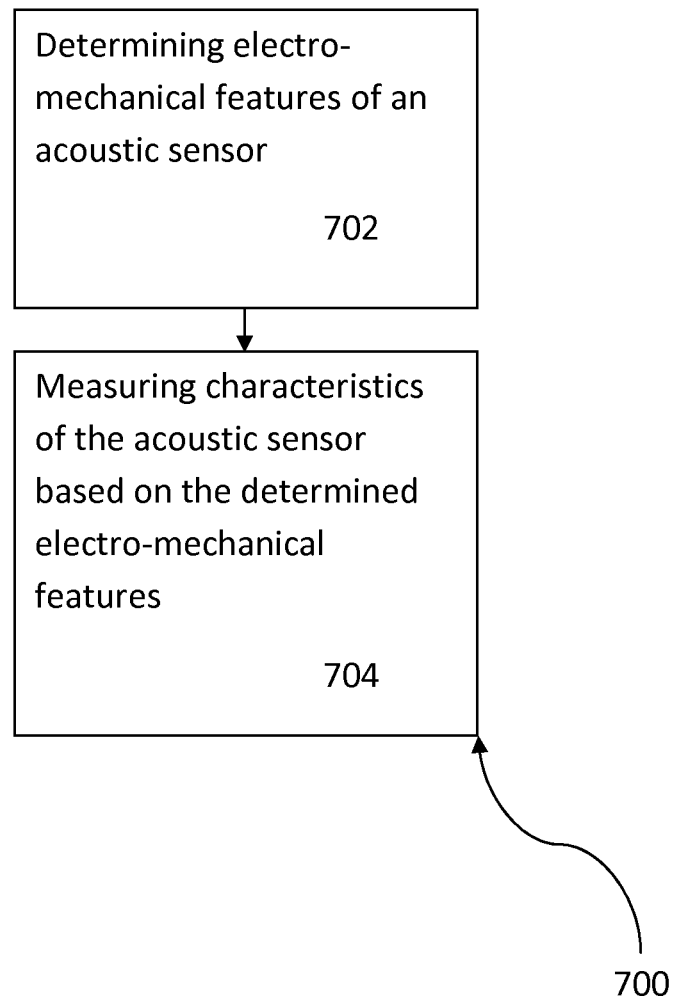
FIG. 7 illustrates a method for testing an acoustic sensor in accordance with an embodiment.

FIG. 7 illustrates a method 700 for testing an acoustic sensor in accordance with an embodiment. In one embodiment, the acoustic sensor is a MEMS microphone. The method 700 includes determining electro-mechanical features of the acoustic sensor, via step 702, and measuring characteristics of the acoustic sensor based on the determined electro-mechanical features, via step 704. In one embodiment, the method 700 further includes utilizing an electrical feedthrough cancellation system/circuit of the acoustic sensor to remove unwanted effects of electrical feedthrough signals.

In another embodiment, the method 700 further includes utilizing an actuation signal to electrically evaluate sensitivity of the acoustic sensor to acoustic signals. The actuation signal is applied to the acoustic sensor to generate a response and the actuation signal can include, but is not limited to, any of magnetic, thermal, piezoelectric, and electrostatic forces. In one embodiment, the sensitivity of the acoustic sensor to acoustic signals is estimated from the acoustic sensor's response to the electrostatic force that is applied to the acoustic sensor.

In one embodiment, a method for the testing of the acoustic sensor is utilized to determine other properties of the acoustic sensor that include any of an electrical gap and a mechanical gap between electrodes of the acoustic sensor.

In one embodiment, a method for the testing of the acoustic sensor is implemented during any of a routine process by a manufacturer of the acoustic sensor, and a time period after the acoustic sensor has been integrated into an end product and/or device and is being used in the field.

In one embodiment, the characteristics that are measured via step 704 include a capacitance of the acoustic sensor. In this embodiment, the capacitance of the acoustic sensor is measured at a frequency at which a mechanical response of the acoustic sensor is diminished, thereby reducing unwanted mechanical response. In another embodiment, the unwanted mechanical response is reduced by utilizing any of another actuation (including but not limited to thermal, magnetic, piezoelectric, and electrostatic forces) to cancel unwanted actuation, and mechanical stops to reduce motion of the acoustic sensor when it is engaged or in use. In another embodiment, the capacitance of the acoustic sensor is estimated from a measurement of the electrical feedthrough cancellation system.

In one embodiment, a method utilizes an actuation signal to evaluate mechanical characteristics of the acoustic sensor. The actuation signal includes any of magnetic forces, thermal forces, piezoelectric forces, electrostatic forces, and a pulse signal. In one embodiment, the method further includes utilizing the electrical feedthrough cancellation system of the acoustic sensor to remove unwanted effects of an electrical signal used in actuation. The mechanical characteristics that are evaluated include any of frequency response, impulse response, resonant frequency, spring constant, damping, mass, and quality factor.

In this embodiment, when the actuation signal is an electrostatic force, the electrostatic force is substantially changed in magnitude over a time period that is substantially short compared to a mechanical response time constant of the acoustic sensor. Additionally, the method further includes determining a frequency response of the acoustic sensor based on a response to a change in the electrostatic force.

In one embodiment, a circuit for testing an acoustic sensor comprises a mechanism for driving an electrical signal into a signal path of the acoustic sensor to cancel an electrical feedthrough signal provided to the signal path, wherein any of the electrical signal and the electrical feedthrough signal are within or above an audio range. In one embodiment, the electrical signal is a capacitive feedthrough cancellation signal that tests characteristics of the acoustic signal and the audio range is any of 20 Hz to 20 kHz. The circuit and the acoustic sensor can be any of in a same package, on a same integrated circuit chip, and in different packages. The circuit can adjust any of an amplitude and a phase of the electrical signal to maximize the cancellation of the electrical feedthrough signal.

As above described, a method and system in accordance with the present invention electrically tests an acoustic sensor (e.g., microphone device) by cancelling electrical feedthrough signals at a microphone output when driving a microphone transducer with an electrical signal. Utilizing electrical testing as opposed to conventional acoustical testing enables faster, cheaper, and more accurate testing of the acoustic sensor/microphone because the electrical testing does not require acoustic test equipment. The method and system in accordance with the present invention utilizes feedthrough cancellation circuitry to cancel unwanted electrical feedthrough signals during tests that rely on electrostatic forces, thereby enabling the evaluation of microphone parameters and allowing for the measurement of a transducer capacitance, which saves circuit area and circuit design effort and optimizes circuit reuse.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for testing an acoustic sensor, the method comprising:
   using electro-mechanical features of the acoustic sensor to measure characteristics of the acoustic sensor to facilitate the testing of the acoustic sensor; and
   utilizing electrical feedthrough cancellation to cancel out a portion of an electrical signal that is an electrical feedthrough signal, wherein the electrical signal facilitates the testing of the acoustic sensor.

2. The method of claim 1, wherein the electrical feedthrough signal results from an electronically-controlled transduction of a transducer, comprising the acoustic sensor, and wherein, to facilitate improving accuracy of the testing of the acoustic sensor, the portion of the electrical signal that is the electrical feedthrough signal is canceled out without canceling another portion of the electrical signal that facilitates actuation of the acoustic sensor.

3. The method of claim 1, further comprising:
   utilizing actuation to electronically evaluate sensitivity of the acoustic sensor to acoustic signals.

4. The method of claim 3, wherein the utilizing the actuation comprises at least one of applying magnetic, thermal, or piezoelectric forces to the acoustic sensor to generate a response.

5. The method of claim 3, wherein the utilizing the actuation comprises applying an electrostatic force to the acoustic sensor to generate the response.

6. The method of claim 5, further comprising:
   estimating the sensitivity of the acoustic sensor to acoustic signals based on the response to the electrostatic force.

7. The method of claim 1, wherein the acoustic sensor is a micro-electro-mechanical systems (MEMS) microphone.

8. The method of claim 1, wherein the testing is implemented as a routine during manufacture of the acoustic sensor.

9. The method of claim 1, wherein the testing is implemented during a lifetime of the acoustic sensor.

10. The method of claim 1, wherein the testing is implemented after the acoustic sensor is integrated into an end product.

11. The method of claim 1, wherein the characteristics include a capacitance of the acoustic sensor.

12. The method of claim 11, wherein the capacitance is measured at a frequency at which a mechanical response of the acoustic sensor is diminished to facilitate reducing a mechanical response associated with motion of the acoustic sensor to facilitate determining the electrical feedthrough signal.

13. The method of claim 12, further comprising:
   reducing the mechanical response by utilizing a cancellation actuation to facilitate reducing an actuation associated with the acoustic sensor.

14. The method of claim 13, wherein the another actuation comprises at least one of thermal, magnetic, piezoelectric, or electrostatic forces.

15. The method of claim 12, further comprising:
   reducing the mechanical response by utilizing mechanical stops to reduce motion of the acoustic sensor when engaged.

16. The method of claim 11, further comprising:
   estimating the capacitance based on a measurement of the electrical feedthrough cancellation.

17. The method of claim 1, wherein the testing is utilized to determine other properties of the acoustic sensor that include at least one of an electrical gap or a mechanical gap between electrodes of the acoustic sensor.

18. A method for testing an acoustic sensor, the method comprising:
   utilizing an actuation signal to evaluate mechanical characteristics of the acoustic sensor wherein the actuation signal is used to facilitate actuation of the acoustic sensor; and
   utilizing electrical feedthrough cancellation to cancel out a portion of the actuation signal that is an electrical feedthrough signal.

19. The method of claim 18, wherein the actuation signal comprises a pulse.

20. The method of claim 18, wherein the electrical feedthrough signal results from an electronically-controlled transduction of the acoustic sensor, and wherein, to facilitate improving accuracy of the testing of the acoustic sensor, the portion of the actuation signal that is the electrical feedthrough signal is canceled out without canceling another portion of the actuation signal that facilitates actuation of the acoustic sensor.

21. The method of claim 18, wherein the mechanical characteristics include at least one of a frequency response, an impulse response, a resonant frequency, a spring constant, a damping, a mass, or a quality factor.

22. The method of claim 18, wherein the actuation signal comprises of at least one magnetic, thermal, or piezoelectric forces.

23. The method of claim 18, wherein the actuation signal comprises an electrostatic force.

24. The method of claim 23, wherein the electrostatic force is substantially changed in magnitude over a time period that is shorter than a mechanical response time constant of the acoustic sensor.

25. The method of claim 23, further comprising:
   determining a frequency response of the acoustic sensor based on a response to a change in the electrostatic force.

26. The method of claim 18, wherein the testing is implemented as a routine during manufacture of the acoustic sensor.

27. The method of claim 18, wherein the testing is implemented during a lifetime of the acoustic sensor.

28. The method of claim 18, wherein the testing is implemented after the acoustic sensor is integrated into an end product.

* * * * *